(12) United States Patent
Fie, II

(10) Patent No.: US 9,950,268 B2
(45) Date of Patent: Apr. 24, 2018

(54) ADJUSTABLE TOE SUSPENSION ARM

(71) Applicant: Custom Works RC Products LLC, Denver, NC (US)

(72) Inventor: E. Arnold Fie, II, Denver, NC (US)

(73) Assignee: Custom Works RC Products, LLC, Denver, NC (US)

(*) Notice: Subject to any disclaimer, the term of this patent is extended or adjusted under 35 U.S.C. 154(b) by 0 days.

(21) Appl. No.: 15/226,559

(22) Filed: Aug. 2, 2016

(65) Prior Publication Data
US 2016/0339350 A1 Nov. 24, 2016

Related U.S. Application Data

(63) Continuation-in-part of application No. 14/022,318, filed on Sep. 10, 2013, now Pat. No. 9,409,096.

(51) Int. Cl.
*A63H 17/26* (2006.01)
*B62D 17/00* (2006.01)

(52) U.S. Cl.
CPC .......... *A63H 17/262* (2013.01); *B62D 17/00* (2013.01); *B60G 2200/462* (2013.01); *B60G 2200/4622* (2013.01)

(58) Field of Classification Search
CPC .............. B62D 17/00; B60G 2200/462; B60G 2200/4622; A63H 17/262
See application file for complete search history.

(56) References Cited

U.S. PATENT DOCUMENTS

| | | | | | |
|---|---|---|---|---|---|
| 2,732,233 | A | * | 1/1956 | MacMillan et al. | B62D 17/00 280/86.758 |
| 3,635,304 | A | * | 1/1972 | Hills | B62D 1/24 180/400 |
| 4,143,887 | A | * | 3/1979 | Williams | B60G 3/06 267/190 |
| 4,714,270 | A | * | 12/1987 | Rumpel | B60G 3/26 280/124.144 |
| 4,718,691 | A | * | 1/1988 | Specktor | B60G 7/02 280/86.75 |
| RE33,179 | E | * | 3/1990 | Pettibone | B60G 3/205 280/86.75 |
| 5,826,894 | A | * | 10/1998 | McDonald | B60G 3/202 280/86.75 |
| 5,941,545 | A | * | 8/1999 | Park | B60G 7/02 280/86.75 |
| 6,047,789 | A | * | 4/2000 | Iwanaga | B62D 17/00 180/440 |
| 6,402,168 | B1 | * | 6/2002 | Chino | B62D 17/00 280/86.754 |
| 6,435,527 | B1 | * | 8/2002 | Katae | B62D 17/00 280/86.758 |

(Continued)

*Primary Examiner* — Laura Freedman
(74) *Attorney, Agent, or Firm* — Ice Miller LLP

(57) ABSTRACT

An adjustable toe suspension arm for a vehicle is provided having a main suspension bracket coupled to a vehicle chassis. An outer swing bracket is pivotably coupled to the main suspension bracket. An adjustment mechanism is operably coupled to the main suspension bracket. An actuating mechanism is coupled to the adjustment mechanism. A portion of the actuating mechanism is in contact with the outer swing bracket. When the adjustment mechanism is manipulated, the actuating mechanism moves to rotate the outer swing bracket with respect to the main suspension bracket.

8 Claims, 4 Drawing Sheets

(56) References Cited

U.S. PATENT DOCUMENTS

| | | | | |
|---|---|---|---|---|
| 6,446,991 | B1* | 9/2002 | Klais | B60G 7/02 |
| | | | | 280/124.134 |
| 7,111,855 | B2* | 9/2006 | Winkler | B60G 3/20 |
| | | | | 280/86.754 |
| 7,334,805 | B2* | 2/2008 | Nam | B60G 7/008 |
| | | | | 280/86.751 |
| 8,215,653 | B2* | 7/2012 | Siebeneick | B60G 7/008 |
| | | | | 280/5.52 |
| 9,409,096 | B2* | 8/2016 | Fie, II | B62D 17/00 |
| 9,616,724 | B2* | 4/2017 | Ariga | B60G 7/001 |
| 2005/0067803 | A1* | 3/2005 | Inayoshi | B60G 7/02 |
| | | | | 280/86.75 |
| 2014/0091542 | A1* | 4/2014 | Luttinen | B62D 7/166 |
| | | | | 280/86.75 |
| 2017/0015173 | A1* | 1/2017 | Battaglia | B60G 3/18 |

* cited by examiner

MAIN SUSPENSION BRACKET

MATING POINT WITH "OUTER SWING BRACKET" TO CREATE PIVOT CENTER.

MATING POINT WITH "MAIN SUSPENSION BRACKET" TO CREATE PIVOT CENTER.

OUTER SWING BRACKET

ADJUSTABLE TOE SUSPENSION ARM

CROSS-REFERENCE TO RELATED APPLICATIONS

The present application is a continuation-in-part of and claims priority to U.S. patent application Ser. No. 14/022,318, filed Sep. 10, 2013, and having the title "Adjustable Toe Suspension Arm," which is herein incorporated by reference in its entirety.

TECHNICAL FIELD

The disclosed embodiments relate generally to vehicles and, more particularly to an adjustable toe suspension arm for a vehicle.

BACKGROUND OF THE EMBODIMENTS

This suspension arm type is widely used in the design of many vehicles and especially remote control vehicles for its simplicity, strength, and cost. The means of setting the vehicle's tracking characteristic or "toe" is typically achieved by integrally choosing the angle of the tire's tracking by either the inboard hinge where the suspension arm pivots at the vehicle chassis or the outboard hinge where the suspension arm hinges with a component that houses an axle, bearings, and ultimately the tire. Adjustment of the "toe" in this assembly is achieved by changing either one single component or the mounting location of one or more components. With the use of this invention the "toe" characteristic is easily adjustable on the vehicle in a wide degree range both angling the driving tire toward and away from the vehicle chassis by the use of a simple screw driver. This invention allows the "toe" characteristic to be easily and quickly adjustable providing greater control of the vehicle to the radio operator of a remote control vehicle.

SUMMARY OF THE EMBODIMENTS

In an embodiment, an adjustable toe suspension arm for a vehicle is provided having a main suspension bracket coupled to a vehicle chassis. An outer swing bracket is pivotably coupled to the main suspension bracket. An adjustment mechanism is operably coupled to the main suspension bracket. An actuating mechanism is coupled to the adjustment mechanism. A portion of the actuating mechanism is in contact with the outer swing bracket. When the adjustment mechanism is manipulated, the actuating mechanism moves to rotate the outer swing bracket with respect to the main suspension bracket.

In an embodiment, a method of adjusting a vehicle's tracking is provided. The method includes coupling a main suspension bracket to a vehicle chassis. The method also includes pivotably coupling an outer swing bracket to the main suspension bracket. The method also includes coupling an adjustment mechanism to the main suspension bracket. The method also includes coupling an actuating mechanism to the adjustment mechanism. A portion of the actuating mechanism is in contact with the outer swing bracket. The method also includes manipulating the adjustment mechanism to move the actuating mechanism to rotate the outer swing bracket with respect to the main suspension bracket.

DETAILED DESCRIPTION OF THE EMBODIMENTS

Figure 1:
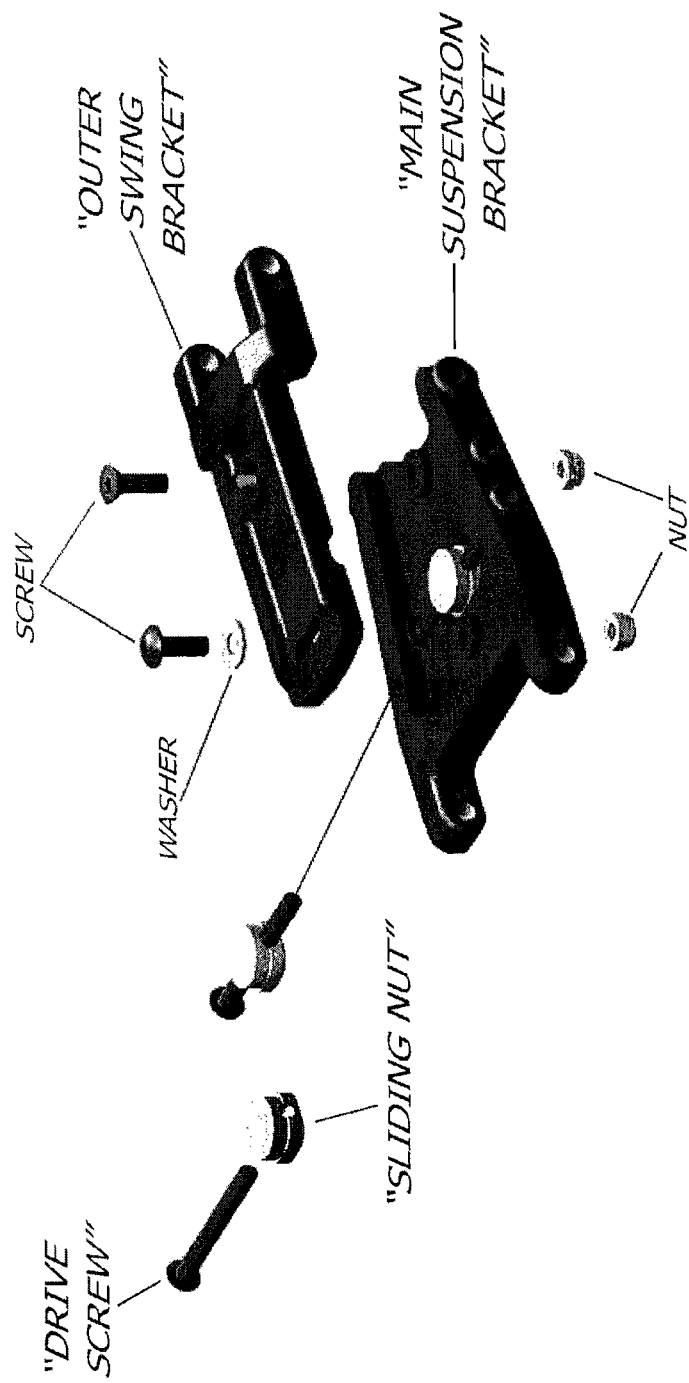
FIG. 1 is an exploded view of a suspension arm formed in accordance with an embodiment.
Figure 2A:
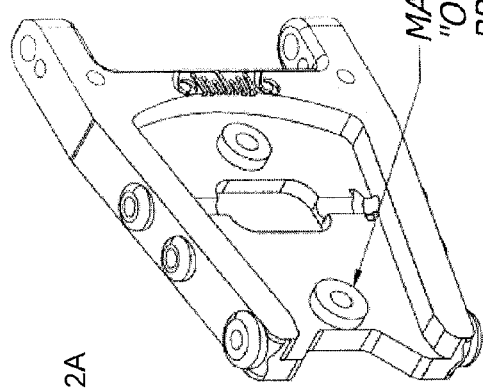
FIG. 2A is a perspective view of a main suspension bracket.
Figure 2C:
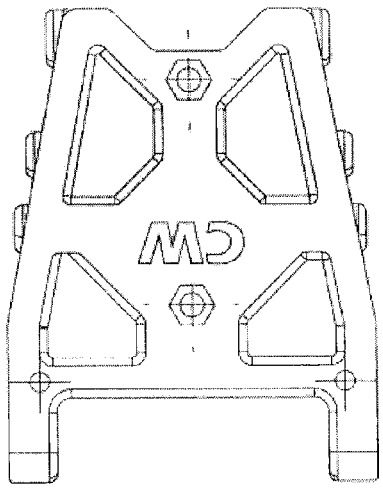
FIG. 2C is a bottom view of the main suspension bracket shown in FIG. 2A.
Figure 2B:
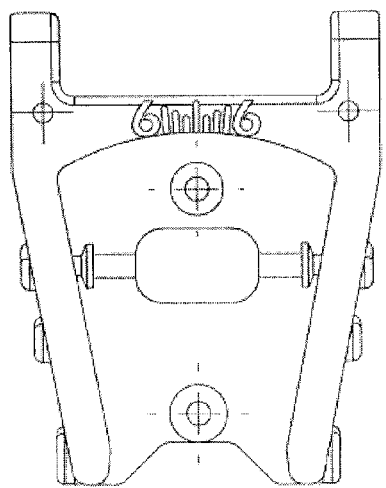
FIG. 2B is a top view of the main suspension bracket shown in FIG. 2A.
Figure 3A:
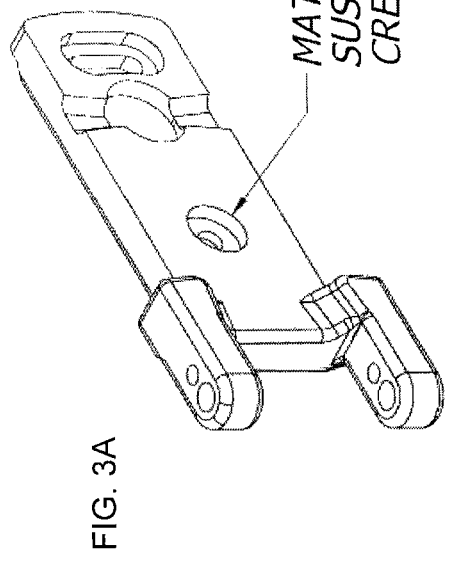
FIG. 3A is a perspective view of an outer swing bracket.
Figure 3C:
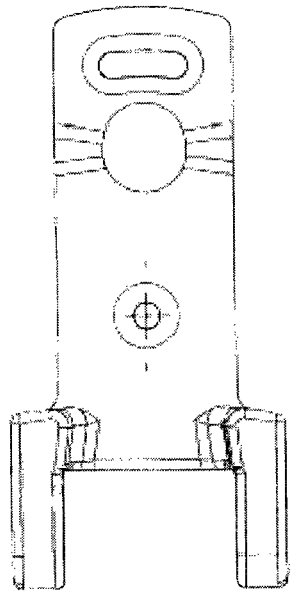
FIG. 3C is a bottom view of the outer swing bracket shown in FIG. 3A.
Figure 3B:
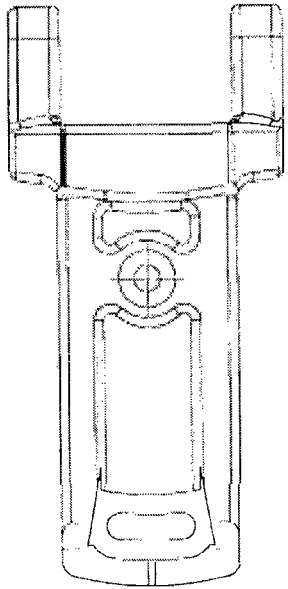
FIG. 3B is a top view of the outer swing bracket shown in FIG. 3A.
Figure 4:
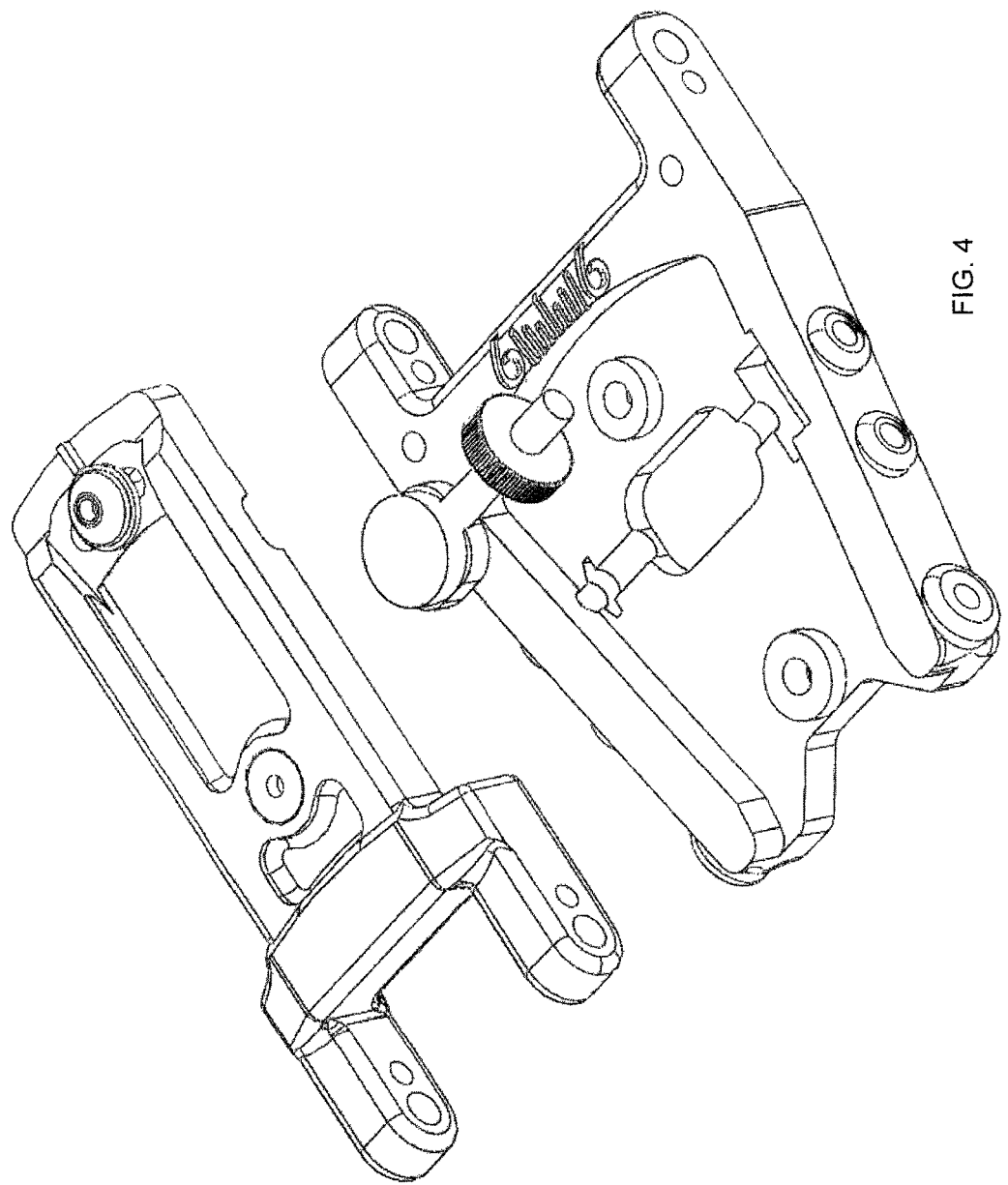
FIG. 4 is an exploded view of a suspension arm formed in accordance with an embodiment with a tie rod.

Sliding Nut is threaded roughly half way down the entire length of the Drive Screw's threads so that approximately equal portions of the Drive Screw are on each side of the Sliding Nut. Drive Screw is housed in a fixed location in the Main Suspension Bracket so as when the Drive Screw is turned, it does not change location relative to the Main Suspension Bracket. With the Drive Screw in its housing, the Sliding Nut locates in a slotted channel parallel to the Drive Screw. Affixing the Outer Swing Bracket to the Main Suspension Bracket using simple screws and nuts encloses and secures the Drive Screw and Sliding Nut mechanism. The remaining portion of the Sliding Nut locates into a Pocket in the Outer Swing Bracket that is elongated only slightly in a direction perpendicular to the Drive Screw.

With the parts assembled a screw driver tool is placed thru a hole in the Main Suspension Bracket to gain access and engage movement to the Drive Screw. Turning the Drive Screw in its fixed location only allows for rotational movement only for the Drive Screw. The turning of the Dive Screw and its thread engagement to the Slide Nut causes the Sliding Nut to move up or down the path of travel on the threads of the Drive Screw depending on which way the Drive Screw is rotated. Consequently this causes the Slide Nut to change its location within its mating channel in the Main Suspension Bracket and the mating pocket in the Outer Swing Bracket. As the Sliding Nut moves with the rotational movement of the Drive Screw, the Sliding Nut movement along a straight path rotates the Outer Swing, changing the angle of the outboard hinge where the component that houses an axle, bearings, and ultimately the tire is located effectively resulting in a change of the vehicle's track or "toe".

What is claimed is:

1. An adjustable toe suspension arm for a vehicle comprising:
   a main suspension bracket coupled to a vehicle chassis;
   an outer swing bracket pivotably coupled to the main suspension bracket;
   an adjustment mechanism operably coupled to the main suspension bracket and at a fixed location with respect to the main suspension bracket; and
   an actuating mechanism coupled to the adjustment mechanism, wherein a portion of the actuating mechanism is in contact with the outer swing bracket;
   wherein, when the adjustment mechanism is manipulated, the actuating mechanism moves to rotate the outer swing bracket with respect to the main suspension bracket.

2. The adjustable toe suspension arm of claim 1, wherein a portion of the outer swing bracket is operatively coupled to a tire of the vehicle such that rotation of the outer swing bracket changes an orientation of the tire with respect to the vehicle chassis.

3. The adjustable toe suspension arm of claim 1, wherein the vehicle is a radio controlled vehicle.

4. The adjustable toe suspension arm of claim 1, wherein the actuating mechanism comprises a sliding nut.

5. A method of adjusting a vehicle's tracking, the method comprising:
- coupling a main suspension bracket to a vehicle chassis;
- pivotably coupling an outer swing bracket to the main suspension bracket;
- coupling an adjustment mechanism to the main suspension bracket at a fixed location with respect to the main suspension bracket;
- coupling an actuating mechanism to the adjustment mechanism, wherein a portion of the actuating mechanism is in contact with the outer swing bracket; and
- manipulating the adjustment mechanism to move the actuating mechanism to rotate the outer swing bracket with respect to the main suspension bracket.

6. The method of claim 5, wherein a portion of the outer swing bracket is operatively coupled to a tire of the vehicle, the method further comprising manipulating the adjustment mechanism such that rotation of the outer swing bracket changes an orientation of the tire with respect to the vehicle chassis.

7. The method of claim 5 further comprising adjusting the tracking of a radio controlled vehicle.

8. The method of claim 5, wherein the actuating mechanism comprises a sliding nut.

\* \* \* \* \*